United States Patent Office 2,841,608
Patented July 1, 1958

2,841,608

CYCLIC GLYCOL PHOSPHITES

Ingenuin Hechenbleikner, Clarksburg, and Francis C. Lanoue, North Adams, Mass., assignors to Shea Chemical Corporation, Jeffersonville, Ind., and Columbia, Tenn., a corporation of Tennessee No Drawing. Application May 21, 1956
Serial No. 585,958

10 Claims. (Cl. 260—461)

This invention relates to novel glycol phosphites and to vinyl and vinylidene resins stabilized with such phosphites.

It is an object of the present invention to prepare new cyclic glycol phosphites.

A further object is to prepare halogen containing vinyl and vinylidene resin compositions showing improved resistance to discoloration on exposure to the action of heat or light.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

These objects are accomplished by reacting two mols of a tertiary aromatic phosphite with three mols of a glycol having adjacent hydroxyl groups. It is critical to the success of the present invention that this mol ratio be adhered to as when other ratios of the tertiary aromatic phosphite to glycol are employed the products of the present invention are not formed but instead there are formed entirely different materials such as those described, for example, in Hechenbleikner applications Serial Nos. 555,763 and 555,762, filed on December 28, 1955.

The products of the present invention have the formulae:

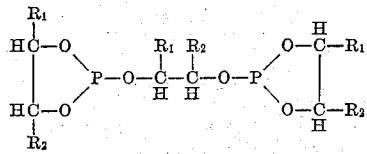

where $R_1$ and $R_2$ are either hydrogen or an alkyl group.

The new compounds have been found to have a variety of use. Thus, they can be used as heat and light stabilizers for halogen containing vinyl and vinylidene resins as set forth below. They also are useful as antioxidants, e. g., for natural rubber, synthetic rubber, e. g., butadiene-styrene copolymer, etc.

The tertiary aromatic phosphites used to react with the glycols have the formula

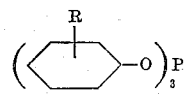

where R is hydrogen, hydrocarbon or halogen.

As the starting phosphites, there can be employed triphenyl phosphite, tri-4-chlorophenyl phosphite; tri-2-chlorophenyl phosphite; tri-3-chlorophenyl phosphite; tri-2-methylphenyl phosphite; tri-3-methylphenyl phosphite; tri-4-methylphenyl phosphite; the trimethylphenyl phosphite made by using a commercial meta-paracresol mixture as the starting material; tri-2-bromophenyl phosphite; tri-4-tert. butylphenyl phosphite; tri-2-tert. butylphenyl phosphite; tri-4-n-butylphenyl phosphite, tri-4-n-octylphenyl phosphite, tri-2-cyclohexylphenyl phosphite; 2,4-dimethylphenyl phosphite.

As the starting glycols, there can be used, for example, ethylene glycol; 1,2-propylene glycol; 1,2-butylene glycol; 2,3-butylene glycol; 3,4-hexyene glycol, and 1,2-hexylene glycol.

As typical examples of the new products, there may be mentioned:

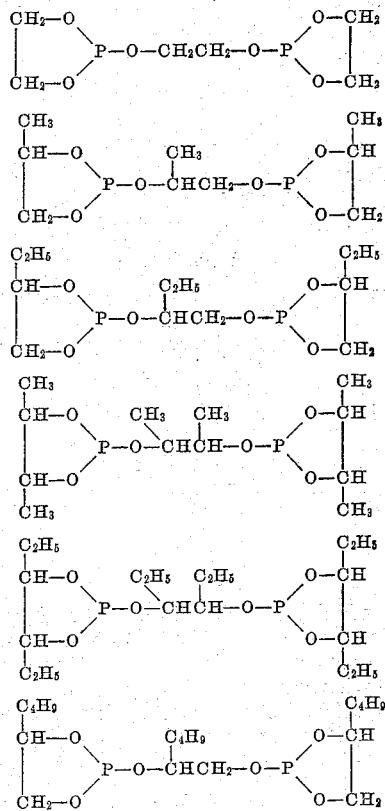

The reaction between the tertiary aromatic phosphite and the glycol can be carried out at widely varying temperatures, e. g., from room temperature up to 130° C. or even higher. There is no need to use a catalyst soluble in the reaction medium, particularly when lower temperatures such as 20° C., for example, are employed. Typical examples of catalysts are sodium phenate, trialkyl amines, e. g., triethyl amine, pyridine, etc. When a catalyst is employed, it is preferably used in a small amount, e. g., 0.01 mol per mol of the glycol employed.

It is also possible to prepare the compounds of the present invention by reacting two mols of the appropriate monochlorocycloethylene phosphite with one mol of the appropriate glycol in the presence of two mols of the appropriate tertiary amine in accordance with the equation

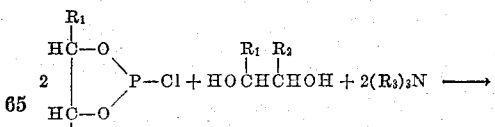

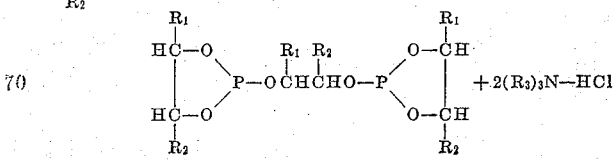

In the above formula $R_1$ and $R_2$ are hydrogen or alkyl groups and $R_3$ is an alkyl group. Other tertiary amines such as pyridine can be used in place of the tertiary alkyl amine, e. g., triethyl amine. Frequently, it is advantageous to facilitate reaction by having an inert organic solvent such as ether or benzene present.

*Example 1*

Two mols of triphenyl phosphite were heated with heated with three mols of ethylene glycol in the presence of 0.01 mol of sodium phenate. After heating for 1.0 hour, the slight amounts of residual ethylene glycol and triphenyl phosphite were removed by distillation at reduced pressure to leave as a residue in the flask the desired product having the formula $$\begin{array}{c}CH_2-O\\|\\CH_2-O\end{array}\!\!\!\!P-O-CH_2CH_2-O-P\!\!\!\!\begin{array}{c}O-CH_2\\|\\O-CH_2\end{array}$$

a liquid with a melting point below 0° C., $N_d^{25}$ 1.49325, $D_4^{25}$ 1.3200. The product is insoluble with hexane and reacts with alcohol. It is soluble in acetone, benzene, toluene and chlorinated hydrocarbons.

*Example 2*

Example 1 was repeated without the use of the sodium phenate catalyst with a somewhat longer heating time at 100° C. with substantially the same results.

*Example 3*

One mol of ethylene glycol was mixed with 2 mols of triethylamine in one liter of diethyl ether at room temperature and there was gradually added over a period of about one half hour 2 mols of $$\begin{array}{c}CH_2-O\\|\\CH_2-O\end{array}\!\!\!\!P-Cl$$

When the addition was complete, the triethylamine hydrochloride formed was filtered off and the solvent stripped off at atmospheric pressure. The residue was subjected to distillation at reduced pressure to remove the residual glycol and starting monochloro cyclic ethylene phosphite to leave the desired $$\begin{array}{c}CH_2-O\\|\\CH_2-O\end{array}\!\!\!\!P-O-CH_2CH_2-O-P\!\!\!\!\begin{array}{c}O-CH_2\\|\\O-CH_2\end{array}$$

as the residue in the flask.

Any of the other new glycol phosphites set forth above can be prepared as set forth in Examples 1 and 2 by replacing the ethylene glycol by the appropriate other glycol. It is also possible to replace the triphenyl phosphite by any of the other aromatic phosphites.

The new glycol phosphites of the present invention have been found to be useful as heat and light stabilizers for halogen containing vinyl and vinylidene resins in which the halogen is attached directly to the carbon atoms in the polymer chain. Preferably, the resin is a vinyl halide resin, specifically a vinyl chloride resin. Usually the vinyl chloride resin is made from monomers consisting of vinyl chloride alone or a mixture of monomers comprising at least 70% vinyl chloride by weight. The phosphite stabilizer is normally used in an amount of 0.05 to 20 parts per 100 parts of the vinyl chloride resin and preferably in an amount between 0.5 and 10 parts per 100 parts of resin.

As the chlorinated resin there can be employed chlorinated polyethylene having about 14 to about 75% chlorine by weight, e. g., 27% chlorine by weight, polyvinyl chloride, polyvinylidene chloride, polyvinyl bromide, polyvinyl fluoride, copolymers of vinyl chloride with 1 to 30% by weight copolymerizable materials, such as vinyl acetate, vinylidene chloride, diethyl fumarate, diethyl maleate, and other alkyl fumarates and maleates, vinyl propionate, methyl acrylate, ethyl acrylate, butyl acrylate and other alkyl acrylates, methyl methacrylate, ethyl methacrylate, butyl methacrylate and other methacrylates, methyl alpha chloroacrylate, styrene, trichloroethylene, etc. Typical copolymers include vinyl chloride-vinyl acetate (95:5 weight ratio), vinyl chloride-vinyl acetate (87:13 weight ratio), vinyl chloride-vinyl acetate-maleic anhydride (86:13:1 weight ratio), vinyl chloride-vinylidene chloride (95:5 weight ratio), vinyl chloride-diethyl fumarate (95:5 weight ratio), vinyl chloride-trichloroethylene (95.5 weight ratio).

The vinyl and vinylidene polymers employed and copolymers can be formed by any of the conventional processes. Suitable methods include aqueous emulsion polymerization as well as organic solvent polymerization, etc.

The stabilizers of the present invention can be incorporated with the resins in conventional manner. Thus, they can be mixed together with or without a volatile solvent, such as acetone, and the resulting mixture milled on rolls at 100 to 160° C. until it is completely homogenized. To prevent discoloration due to heat, it is preferable to mix the resin and stabilizer thoroughly before heating. The stabilized resin is removed from the mill in the form of a sheet and can be used as such.

In addition to the novel stabilizer there can also be incorporated with the resin plasticizers, pigments, fillers and other conventional additives, either prior to or during the milling operation. If a plasticizer is employed, it is used in conventional amount, e. g., 40 to 150 parts per 100 parts of resin. Typical plasticizers are di-2-ethylhexyl phthalate, dibutyl sebacate, dioctyl sebacate, tricresyl phosphate, etc.

*Example 4*

100 parts by weight of polyvinyl chloride, 40 parts by weight dioctyl sebacate and 5 parts by weight of $$\begin{array}{c}CH_2-O\\|\\CH_2-O\end{array}\!\!\!\!P-OCH_2CH_2O-P\!\!\!\!\begin{array}{c}O-CH_2\\|\\O-CH_2\end{array}$$

were thoroughly mixed and then homogenized by working on a roll mill heated at 145° C. for 3 minutes. The composition thus produced was removed in the form of a colorless sheet. This sheet proved resistant to color changes, e. g., on exposure to sunlight or upon being subjected to 160° C. for 5 minutes. Without the phosphite a control sample seriously discolored under these testing conditions.

*Example 5*

100 parts of a copolymer of 85% by weight vinyl chloride and 15% of vinyl acetate was similarly mixed and homogenized with 5 parts by weight of the phosphite used in Example 4 on the roll mill heated to 150° C. for 3 minutes. The resulting sheet was resistant to discoloration upon subsequent heating to 160° C. for 5 minutes.

In place of the particular phosphite used in Examples 4 and 5, there can be employed any of the other novel glycol phosphites set forth above.

Unless otherwise stated, all parts and proportions in the present specification and claims are by weight.

We claim:

1.

$$\begin{array}{c}R_1\\|\\HC-O\\|\\HC-O\\|\\R_2\end{array}\!\!\!\!P-O-\underset{H}{\underset{|}{C}}-\underset{H}{\underset{|}{C}}-O-P\!\!\!\!\begin{array}{c}O-\underset{H}{\underset{|}{C}}-R_1\\\\O-\underset{H}{\underset{|}{C}}-R_2\end{array}$$

wherein $R_1$ and $R_2$ are selected from the group consisting of hydrogen and an alkyl group.

2.

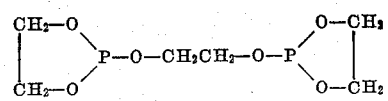

3. A process of preparing the compound of claim 1 comprising transesterifying a glycol having the formula

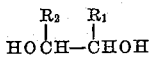

where $R_1$ and $R_2$ are selected from the group consisting of hydrogen and alkyl with a phosphite having the formula

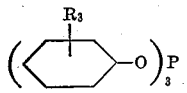

where $R_3$ is selected from the group consisting of hydrogen, hydrocarbon and halogen and there are employed two mols of the phosphite for each three mols of the glycol.

4. A process according to claim 3 wherein the transesterification is carried out under alkaline conditions.

5. A process of preparing the compound of claim 1 comprising condensing 3 mols of a glycol having the formula

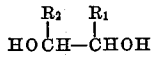

where $R_1$ and $R_2$ are selected from the group consisting of hydrogen and alkyl with two mols of triphenyl phosphite.

6. A process according to claim 5 wherein the condensation is carried out under alkaline conditions.

7. A process of preparing the compound of claim 2 comprising condensing 3 mols of ethylene glycol with 2 mols of a phosphite having the formula

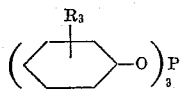

where $R_3$ is selected from the group consisting of hydrogen, hydrocarbon and halogen.

8. A process according to claim 7 wherein the condensation is carried out under alkaline conditions.

9. A process of preparing the compound of claim 2 comprising reacting 3 mols of ethylene glycol with 2 mols of triphenyl phosphite.

10. A process according to claim 9 wherein the reaction is carried out under alkaline conditions.

References Cited in the file of this patent
UNITED STATES PATENTS

| | | |
|---|---|---|
| 2,175,509 | Rogers et al. | Oct. 10, 1939 |
| 2,241,244 | Conary et al. | May 6, 1941 |
| 2,530,353 | Havens | Nov. 14, 1950 |
| 2,686,170 | Best | Aug. 10, 1954 |